Figure 1:
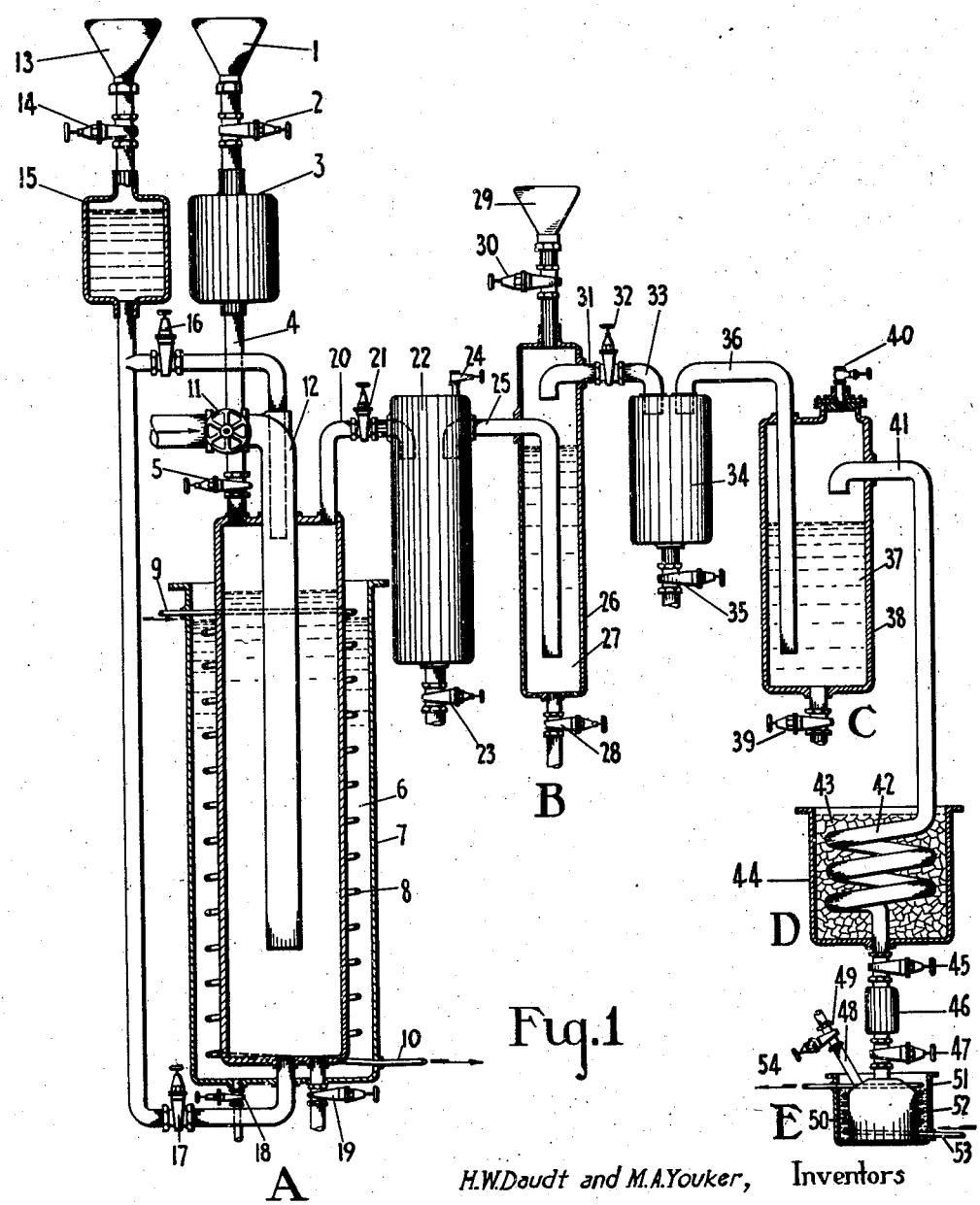

H.W.Daudt and M.A.Youker, Inventors

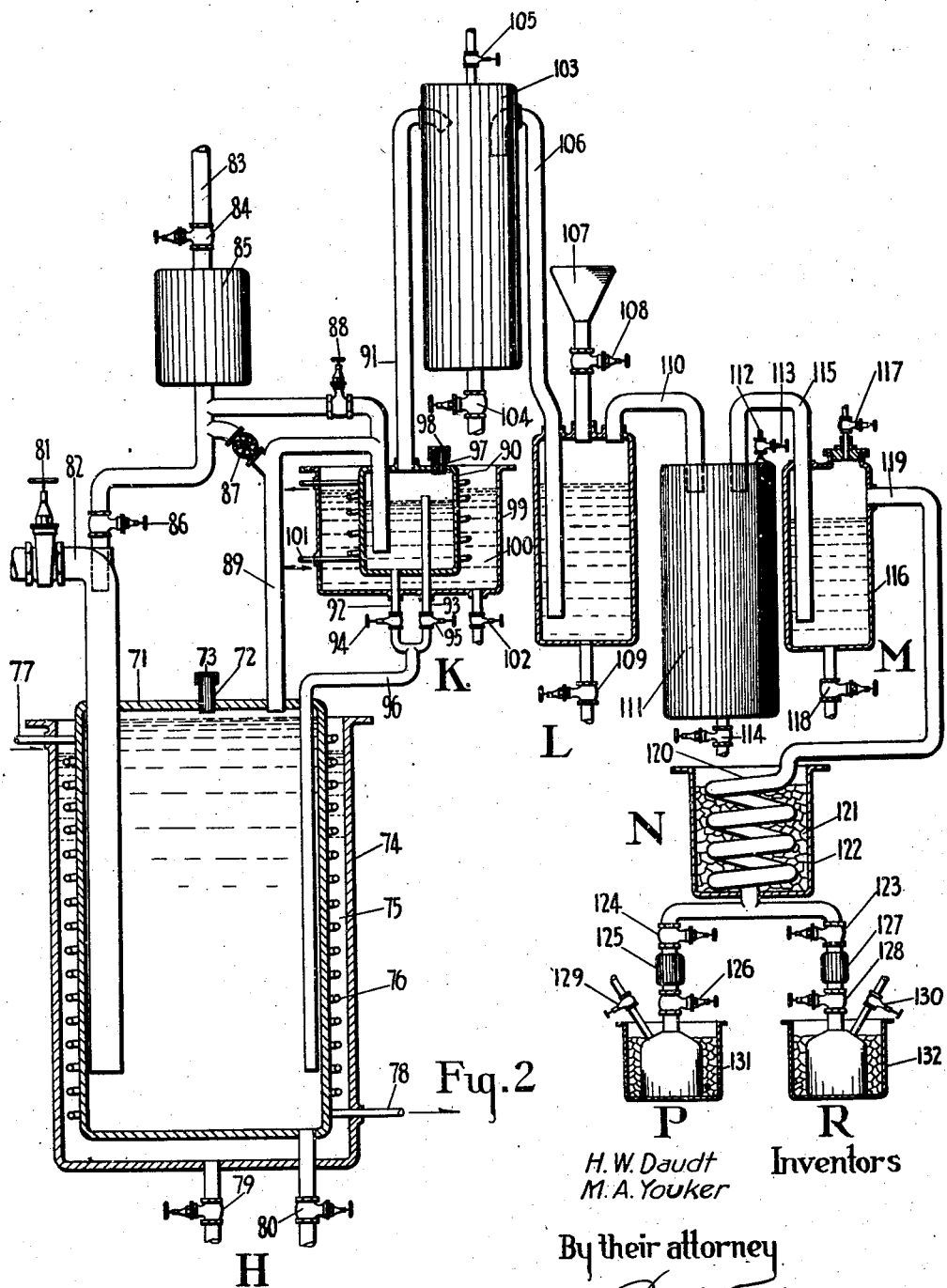

Patented June 18, 1935

2,005,705

UNITED STATES PATENT OFFICE 2,005,705

PREPARATION OF CARBON COMPOUNDS CONTAINING FLUORINE

Herbert W. Daudt and Mortimer A. Youker, Wilmington, Del., assignors, by mesne assignments, to Kinetic Chemicals, Incorporated, Wilmington, Del., a corporation of Delaware Application September 20, 1930, Serial No. 483,289

27 Claims. (Cl. 260—162)

This invention relates to fluorine derivatives of organic compounds and more particularly to the preparation or regeneration of the active agent used in producing the desired products. It especially contemplates a practical process for the fluorination of organic halogen compounds with hydrogen fluoride.

This invention has for an object the provision of a novel fluorinating process which is more simple than known processes for fluorinating organic compounds. Further objects are the production of economic and commercial processes for the production of organic fluorine compounds. Other objects will appear hereinafter.

These objects are accomplished by the present invention, certain embodiments of which, are disclosed by the processes hereinafter described and the apparatuses illustrated in the accompanying drawings in which Fig. 1 is a side view partly in section and somewhat diagrammatic of one form of apparatus for carrying out the invention, and Fig. 2 is a similar view of a modified form of apparatus.

Similar characters refer to similar parts throughout the drawings.

In general, this invention comprises reacting a compound containing at least one acyclic carbon atom having attached thereto at least one atom of a halogen other than fluorine (that is, a halogen having an atomic weight greater than 19) with hydrogen fluoride in the presence of a catalyst such as an antimony compound. This may be done conveniently in a reactor such as that shown, A (Fig. 1) or H (Fig. 2). As a result of this reaction the acyclic compound has a part or all of its halogen content (other than fluorine) replaced by fluorine. The resultant gaseous fluorinated acyclic product together with any hydrogen halide formed or present is then led into a scrubber filled with some material capable of removing the hydrogen halide. This may conveniently be a container filled with a solution of caustic alkali, milk of lime, or the like, as shown at B (Fig. 1) and L (Fig. 2). If desired, the mixed gases before being passed through the hydrogen halide remover may be passed through a washer (shown at K in Fig. 2) containing some of the acyclic compound being treated. This washer serves to collect any of the antimony compound (or other catalyst) which might leave the reactor. This washer may also permit further interaction between the compounds entering into the reaction.

In the case where aqueous scrubbing agents are used to remove the hydrogen halides from the fluorinated acyclic product the theretofore dry gas may become mixed with water vapor. Subsequently, it may be conveniently dried by passing through a drying scrubber such as shown at C (Fig. 1) or M (Fig. 2). This scrubber will ordinarily contain sulphuric acid, stick caustic, or the like. For convenience of storage and transportation the resultant dry-neutral-fluorinated-acyclic-product may be liquefied.

This liquefaction may be accomplished by passing the gaseous product through a condenser such as shown at D (Fig. 1) and N (Fig. 2). Following its condensation, the liquefied product may be run into storage containers such as illustrated at E (Fig. 1) P (Fig. 2) and R (Fig. 2).

The invention will be readily understood from the following detailed description. For convenience, the process is described in connection with specific compounds, namely, carbon-tetra-chloride (the acyclic halogen compound) and antimony-penta-chloride (the catalyst).

Referring to Fig. 1, antimony-penta-chloride is run into reactor A until the desired level is reached. This addition is made through funnel 1, valve 2, reservoir 3, line 4 and valve 5. When the desired liquid level in the reactor has been reached valve 5 is closed.

The reactor A comprises an inner container surrounded by an oil bath 6 in an outer container 7. This oil bath is utilized to maintain constant the temperature of the reacting components in the inner container. The temperature of the oil bath is, in turn, regulated by means of a heating coil 8 which is shown coiled about the inner container and connected with a suitable inlet for heated material (for example, steam) through line 9 and connected with a suitable outlet through line 10. The outer container may be emptied through valve 18 when desired. The inner container has a bottom outlet through valve 19.

Before starting the reaction the inner container is filled with antimony-penta-chloride to the desired depth as described above. Thereafter, hydrogen fluoride and carbon-tetra-chloride are passed into the antimony-penta-chloride simultaneously.

In such a process valve 11 having been opened, and the flow of hydrogen fluoride started into the reactor, either or both of valves 16 and 17 are opened to allow carbon-tetra-chloride from the reservoir 15 to flow into the reactor. The fluorinated product is given off continuously. The supply of carbon-tetra-chloride in the reservoir 15 may be replenished through funnel 13 and valve 14. It is of special advantage to keep the antimony containing substance in a liquid, or nearly liquid condition at all times.

It is probable that the reaction taking place in reactor A produces some of each of the compounds $CCl_3F$, $CCl_2F_2$ and $CClF_3$. In any event by proper regulation of the temperature of the reaction, time of the reaction, time of contact of materials, relative proportions of the ingredients, etc., the production of the desired compounds is maintained at a maximum.

The mixture of the fluorinated product, (which itself may or may not be a mixture) and hydrogen chloride, containing small proportions of unconsumed carbon-tetra-chloride and hydrogen fluoride, leaves the reactor A through line 20.

The mixed gases pass through valve 21 into a trap 22. This trap has a vent at 24 and bottom outlet at 23. The gases leave the trap through line 25 and pass into a body of aqueous alkali metal hydroxide 27 in container 26 comprising scrubber B. This scrubber has a bottom outlet through valve 28 and may be filled through funnel 29 and valve 30. The neutral fluorinated product, leaves this scrubber through line 31 and passes through valve 32 and line 33 into a second trap 34 which has a bottom outlet at 35.

The gases leave trap 34 through line 36 and pass therefrom through a body of sulphuric acid (or other drying agent) 37 in a container 38 constituting drying scrubber C. Scrubber C has a vent through gate valve 40 and a bottom outlet through valve 39. The gases after being dried may be disposed of as desired, but ordinarily they are condensed, for example, by passing through line 41 into coil 42 surrounded by a suitable refrigerant (such as solid carbon dioxide) indicated at 43 and held in container 44, all of which constitutes condenser D.

The liquefied product runs through valve 45 and separable connection 46 into a storage container generally indicated at E. The illustrated storage container has one opening through valve 47 into the separable connection 46 and another through line 48 and valve 49. While being filled, the storage container is maintained in cooling bath 50 of some suitable substance for example alcohol, the temperature of which is maintained at the desired figure by a suitable refrigerant for example carbon dioxide, circulating in coil 52, surrounding the storage receptacle in container 51. The refrigerating coil has an inlet 53 and outlet 54.

When the storage receptacle is full it may be replaced by an empty receptacle without loss of the product by closing valve 45 before opening the separable connection 46.

Obviously, before separating the full container valve 47 will be closed. The valve 49 is, of course, kept closed during the storage of the container.

Under some operating conditions with the apparatus of Fig. 1, volatilization of antimony halides causes clogging of the delivery line (20) from reactor A. These difficulties have been overcome by modifying the apparatus as illustrated by Fig. 2. The essential features of the last named equipment involve means for the removal of the volatilized antimony halides. The washing of the vapors through carbon-tetra-chloride serves to remove the antimony halides from the fluorinated product before it (the fluorinated product) passes to the caustic scrubber. The addition of a portion of the carbon-tetra-chloride to the reactor by means of the vapor line 89 (Fig. 2) from the reactor, has been found to keep this line clear from detrimental deposits of antimony halide.

In the modification of the apparatus shown in Fig. 2, the reactor H comprises an inner container 71 surrounded by a heating coil 76 and an oil bath 75 in an outer container 74. The inner container has a bottom outlet through valve 80 and the outer container has a bottom outlet through valve 79. The heating coil is connected through inlet 77 to a suitable source of heated material (not shown) and has an outlet through line 78. This reactor operates similarly to reactor A of Fig. 1 described above. It may be filled with antimony-penta-chloride through line 72. When it has been filled to the desired depth, line 72 is closed by cap 73. At the desired time hydrogen fluoride may be added through valve 81 and line 82.

In the apparatus of Fig. 1 the vaporized reaction product, containing the fluorinated compound, or compounds, and hydrogen chloride, passes from reactor A into trap 22 prior to entering scrubber B.

In Fig. 2, the mixed gases pass through line 91 into a corresponding trap 103, but before entry to line 91, the gases pass through a washer generally indicated at K. This washer consists of an inner container 90 surrounded by a cooling bath 100 and a cooling coil 101 in outer container 99. The inner container has a top opening through line 97 which is closed by cap 98. In the operation of the process the inner container is filled to the desired level with carbon-tetra-chloride (or the particular acyclic halogen compound being treated).

Carbon-tetra-chloride is admitted to the reactor H simultaneously with the hydrogen fluoride. The resulting fluorinated product and the hydrogen chloride leave the reactor through line 89 and are washed by passing through the body of carbon-tetra-chloride in washer K; after which they enter line 91 and pass through the succeeding parts of the apparatus which are similar to the parts shown in Fig. 1.

Carbon-tetra-chloride may be admitted to the reactor H in several ways. The source of supply (not shown) is connected to reservoir 85 through line 83 and valve 84. The line leaving the reservoir 85 divides into three lines containing valves 86, 87 and 88 respectively. The valve 86 permits the flow of the carbon-tetra-chloride into the reactor H through the hydrogen fluoride line (similarly to valve 16 in Fig. 1). Valve 87 allows the carbon-tetra-chloride to enter the reactor H through line 89 (the line by which the gaseous products of the reaction leave). As disclosed above, entry through this line allows the carbon-tetra-chloride to flow counter current to the issuing gases, and thereby wash them. This washing results in carrying back into the reactor any antimony compounds which might otherwise deposit in line 89.

Valve 88 allows the filling of the washer K with carbon-tetra-chloride. The washer K has two outlets 92 and 93 through valves 94 and 95 respectively. The outlets are connected to one line 96 which extends down into reactor H. The purpose of these outlets may be explained as follows. When it is desired to operate the washer K on a batch principle, valves 94 and 95 are maintained closed. When the batch of carbon-tetra-chloride used for washing is undesirably contaminated, valve 94 is opened and the batch of carbon-tetra-chloride is dropped into the reactor H through line 96. When it is desired to operate the washer K continuously, valve 94 is kept closed and valve 95 opened. Carbon-tetra-chloride is continuously admitted through valve 88 and the overflow through line 93 runs into reactor H. As stated above the admission of carbon-tetra-chloride to reactor H can be made in a number of ways as will be obvious from the above description. If desired it may be made through any one, any two, or all three of the valves 86, 87, and 88.

The carbon-tetra-chloride in the washer K retains a portion of the fluorinated product, which is consequently fed back to the reactor along with the carbon-tetra-chloride flowing through the washer to the reactor. It will be obvious that with this invention and the apparatus described it is possible to further fluorinate intermediate or partially fluorinated products.

The fluorinated product and hydrogen chloride leave the washer K through line 91 passing into trap 103 and passing out through line 106. This trap has a vent through valve 105 and a bottom outlet through valve 104.

From line 106 these gases pass through the hydrogen halide removing substance (conveniently sodium hydroxide) in the scrubber L. This scrubber has a bottom outlet through valve 109 and may be filled through funnel 107 and valve 108.

The neutral gas leaves scrubber L through line 110 and passes through trap 111 into line 115. This trap has a vent 112, through valve 113 and has a bottom outlet through valve 114.

Through line 115 the gases pass through a quantity of drying material (for example, sulphuric acid) in scrubber M. This scrubber comprises a container 116, a vent through valve 117, and a bottom outlet through valve 118.

The dry neutral gas leaves scrubber M through line 119 and passes into a condenser N, comprising coil 120 surrounded by a suitable refrigerant, indicated at 121 in container 122.

For convenience of operation, the condenser N is connected with two storage receptacles P and R. The convenience referred to, is that of filling one of the two receptacles while an empty container is being substituted for the other, which is full. The condenser is connected to receptacle P through valve 124, separable connection 125 and valve 126. It is also connected to storage container R through valve 123, separable connection 127 and valve 128. Containers P and R are maintained at the proper temperature by a suitable refrigerant (for example, solid carbon dioxide), maintained in suitable vessels 131 and 132. Container P has, in addition to outlet through valve 126, another outlet through valve 129. Container R similarly has an outlet through valve 130.

Those portions of the apparatus which come into contact with the hydrogen-halides and antimony pentahalides present during the reaction have been ordinarily made of some corrosion resistant material, such as copper. In the apparatuses shown, those parts up to the hydrogen halide removers have been constructed of copper. In certain instances it may also be desirable to make the hydrogen halide removers of copper or similar material. After the corroding materials have been removed from the gas stream, ordinary materials of construction may be used, for example, cast iron, wrought iron, steel and the like. It has heretofore been generally understood that glass should not be used in contact with hydrofluoric acid but it has been found that when the process of this invention is operated on a small scale, glass may be used for the reactor and subsequent parts with satisfactory results.

The invention will be further understood from a consideration of the following examples in which the parts are given by weight.

Example I

Five hundred (500) parts (25 mols) of gaseous substantially dry hydrogen fluoride gas were passed rapidly and steadily into reactor H over a period of twenty-five hours. The reactor contained 600 parts of antimony-penta-chloride which is maintained at a temperature of about 60° C. During this time 1925 parts (12½ mols) of carbon-tetra-chloride was run into the reactor H by way of reservoir 85, valve 88, line 93, valve 95 and line 96. The carbon-tetra-chloride in washer K was maintained at a temperature of about 0° C. The condenser N and the receivers P and R were held at about −60° C. by a suitable refrigerant. The product was subjected to fractional distillation.

The combined yield (based on carbon-tetra-chloride) of fluoro-tri-chloro-methane and di-fluoro-di-chloro-methane was about 90%. The product contained about 60% of the di-fluoro-di-chloro-methane and about 40% of the fluoro-tri-chloro-methane.

Example II

A mixture of 75 parts of antimony penta-chloride, 10 parts of antimony tri-chloride and 10 parts of chloroform was placed in the reactor of a set-up similar, in principle, to that illustrated by Fig. 2.

While the above mixture was maintained at about 75° C. there were added substantially anhydrous hydrogen fluoride and cholorform for the desired period of operation. The hydrogen fluoride gas was added at the rate of about 10 parts (by weight) per hour, and the chloroform at the rate of about 70 parts per hour.

During the operation, the temperature of the chloroform in washer K was held at about +25° C. The caustic and the sulphuric acid scrubbers and the intermediate trap were held at a temperature of +50 to +60° C.

The condenser and the receivers were held at approximately −60° C. by means of a suitable refrigerant.

The condensate was subjected to fractional distillation for the purpose of separating di-fluoro-chloro-methane and fluoro-di-chloro-methane. The former boils at about −15° C. under a total pressure of 1520 mm. mercury; the latter boils at about +8.7° C. under atmospheric pressure. This fractional distillation also permits separation of any chloroform carried through the apparatus. Any chloroform which may be recovered may be used again in the operation.

The yield of fluoro-di-chloro-methane is about 80–90% and that of di-fluoro-chloro-methane is about 10–5% both yields being based upon consumed chloroform.

While the process above disclosed is described as being continuous it is to be understood that the apparatuses illustrated in Figs. 1 and 2 might be operated to carry out a batch process.

In such a batch process the hydrogen fluoride and acyclic halogen compound would be added consecutively instead of simultaneously as will be clear from the following example.

Example III

The reactor H was filled with 2000 parts of a mixture of 90% antimony-penta-chloride and 10% antimony-tri-chloride. The mixture was heated to 100° C. One hundred (100) parts of hydrogen fluoride gas were then passed into the reactor. After the addition of the hydrogen fluoride, the supply valve was closed and 385 parts of carbon-tetra-chloride were passed into the reactor. During the addition of the carbon-tetra-chloride the temperature of the antimony compounds was maintained at about 60° C., and the carbon-tetra-chloride in washer K at about 0° C. A yield of about 80-90% of the theoretical amount of mixed di-fluoro-di-chloro-methane and fluoro-tri-chloro-methane was obtained.

As indicated above the process is not limited to the fluorination of carbon-tetra-chloride or chloroform, the materials mentioned specifically in the examples and description. In general, acyclic halogen compounds may be subjected to fluorination in an analogous manner. Among the compounds from which fluorine containing compounds have been obtained, there may be mentioned the following:

Methylene chloride _____ $CH_2Cl_2$
Fluoro-tri-chloro-methane _____ $CFCl_3$
Ethyl chloride _____ $CH_3-CH_2Cl$
Isopropyl bromide _____ $CH_3-CHBr-CH_3$
Ethylene di-bromide _____ $CH_2Br-CH_2Br$
Tetra-chloro-ethane _____ $CHCl_2-CHCl_2$
Tri-chloro ethylene _____ $CHCl=CCl_2$ By the phrase "acyclic compounds" it is intended to cover carbon compounds having an open chain, for example, paraffins, olefines and the like. As further examples of compounds which may be fluorinated in accordance with the present invention may be mentioned compounds containing at least one acyclic carbon atom having attached thereto an aryl radical and a halogen other than fluorine, as, for example, benzo-tri-chloride ($C_6H_5CCl_3$).

By the term "hydrogen fluoride" it is intended to include and to cover not only the pure product, but also hydrogen fluoride or hydrofluoric acid which may contain small amounts of impurities, as for example, water.

As will be clear from the above description, partially fluorinated acyclic compounds, containing other halogen atoms than fluorine, may be further fluorinated by this process.

Where the original organic halogen derivative contains hydrogen, a substitution of halogen for hydrogen may take place during the fluorination operation. This is particularly true if a free halogen such as chlorine, is present in the reaction mass. Examples of such reactions are those taking place when chloro-ethanes containing hydrogen are fluorinated.

In general, where the original acyclic halogen compound is unsaturated, the addition of halogen and the introduction of fluorine may take place in the same operation. For example, from tri-chloro-ethylene, a product containing fluorine derivatives of ethane is obtainable. This reaction is especially likely to take place if a free halogen, such as chlorine, is present.

The antimony halide used is ordinarily in the penta-valent form but in certain instances it may be desirable to replace a portion of the penta-valent compound with the tri-valent compound as explained later.

The penta-valent antimony compound may contain the theoretical proportion of halogen or halogens, it may contain an excess of halogen, or of it may contain an antimony tri-halide.

A free halogen, such as chlorine, may be present or may be added at any time in the process. It is desirable to have a free halogen present when the substances being treated are of such nature that they reduce the penta-valent catalyst compound to the tri-valent form.

An excess of the fluorinated antimony halide favors the introduction of more than one fluorine atom and an excess of the acyclic halogen compound favors the introduction of only one fluorine atom.

The degree of fluorination of the antimony halide may be varied over a wide range, the only requirement being that there be present, a composition represented empirically by $SbF_xCl_{5-x}$, in which $x$ is an integer less than six. As $x$ approaches 5, the substitution by fluorine of more than one halogen atom other than fluorine, in the organic compound is favored.

As stated above it is of advantage to have the antimony containing reaction mass in the liquid condition. This physical state may be maintained by various means, such as by having present, an inert material, for example a previously fluorinated compound liquid at the temperatures employed, a highly halogenated aryl compound or the like. Other means include having present an excess of the acyclic halogen compound being fluorinated, some of that having been fluorinated, or a tri-valent antimony compound.

The temperature range may be widely varied. The reactions take place actively at the ordinary temperature of the room, and appreciably so at temperatures of approximately 0° C. The upper temperature limit is that of the boiling temperature of antimony penta-chloride. The preferred temperature range lies between 45 and 95° C.

The pressure may be that of the atmosphere, or it may be sub-atmospheric or super-atmospheric. The pressure may be adapted to the boiling temperatures of the components or products. For the production of low boiling products the use of super-atmospheric pressures may be of an advantage; for that of high boiling products the use of sub-atmospheric pressures may be found to be advantageous.

The reaction and the separation or isolation of the products by distillation, fractional or otherwise, may be carried out simultaneously or in separate steps. In the latter case, it is not necessary that the pressures of the two steps be the same.

The physical state in which the hydrogen fluoride or the organic halogen derivative is added, is not especially important. The means, illustrated in the examples, afford the easiest control. The two components, if desired, may be added in one stream. For example, the hydrogen fluoride gas may be passed through the liquid acyclic halogen derivative on its way into the reactor.

The invention herein disclosed, has the advantage of greatly reducing the capital expenditure heretofore necessary for fluorination processes. In addition, the costs of operation are also reduced. The difficulties of handling toxic, corrosive and unstable materials have been overcome to a very desirable degree.

So much of the present application as relates to the broader aspects of this invention is described and claimed in our co-pending application Serial No. 717,514 filed March 26, 1934. The process of the invention as it relates to the preparation of certain ethane derivatives containing fluorine is claimed in our co-pending application Serial No. 686,618 filed August 24, 1933. The fluorination of methylene halides is described and claimed specifically in our co-pending application Serial No. 730,842 filed June 15, 1934.

As many apparently widely different embodiments of this invention may be made without departing from the spirit and scope thereof it is to be understood that we do not limit ourselves to the specific embodiments thereof except as defined in the appended claims.

We claim:

1. The process of preparing di-fluoro-di-chloro methane which comprises passing carbon-tetra-chloride and hydrogen fluoride simultaneously into a penta-valent antimony halide.

2. The process of continuously preparing fluorine derivatives of methane which comprises simultaneously treating a pentavalent antimony chloride with a chloro-methane containing more than one chlorine atom and hydrogen fluoride.

3. The process of preparing a fluoro-chloro methane which comprises passing chloroform and hydrogen fluoride into a composition comprising substantially an antimony penta-halide and chloroform.

4. The process of preparing poly-halogen derivatives of methane in which each molecule contains dissimilar halogens, one of which is fluorine, which comprises treating a poly-halogen derivative of methane containing a halogen other than fluorine with hydrogen fluoride and a pentavalent antimony halide containing a halogen other than fluorine.

5. The process of producing di-fluoro-di-chloro methane which comprises treating a composition represented empirically by $SbF_xCl_{5-x}$, where $x$ is an integer less than 6, with carbon-tetrachloride and hydrogen fluoride.

6. The process of producing a fluoro-chloro derivative of methane which comprises treating a composition represented empirically by $SbF_xCl_{5-x}$, where $x$ is an integer less than 6, with a poly-chloro derivative of methane and hydrogen fluoride.

7. The process of producing fluoro-chloro-methanes which comprises passing hydrogen fluoride, chlorine and chloro-methane containing at least three chlorine atoms into a heated mixture of antimony trichloride and antimony pentachloride.

8. The process of preparing fluoro-chloro-methane derivatives which comprises passing gaseous hydrogen fluoride, carbon tetrachloride and chlorine into a heated mixture of antimony trichloride and antimony pentachloride.

9. The process of preparing fluoro-chloro-methane derivatives which comprises passing gaseous hydrogen fluoride, carbon tetrachloride vapor and chlorine into a heated mixture of antimony trichloride and antimony pentachloride.

10. The process of preparing fluorine compounds which comprises reacting an antimony fluoro halide with a halogenated methane containing at least one halogen atom other than fluorine, and regenerating the fluoro halide by treatment with gaseous hydrogen fluoride.

11. The process of producing halogenated methanes containing fluorine which comprises bringing together hydrogen fluoride, a halogenated methane containing a halogen other than fluorine and an antimony halide.

12. The process of producing halogenated methanes containing fluorine which comprises bringing together hydrogen fluoride, a halogenated methane containing a halogen other than fluorine and a mixture of pentavalent and trivalent antimony halides.

13. The process of producing halogenated methanes containing fluorine which comprises treating an antimony pentahalide with hydrogen fluoride, and without further treatment adding a halogenated methane containing a halogen other than fluorine, to produce a fluorine derivative of methane.

14. In the operation involving the continuous addition of hydrogen fluoride and a liquid halogenated methane containing a halogen other than fluorine to an antimony halide, the step of adding said halogenated methane counter-currently to the issuing vapors.

15. In the operation involving the continuous addition of hydrogen fluoride and a liquid halogenated methane containing a halogen other than fluorine to a pentavalent antimony halide, the process of passing the resultant vapors through said halogenated methane.

16. The process of preparing fluorine derivatives of methane which comprises treating a mixture of inert diluent and a pentavalent antimony halide with hydrogen fluoride and a halogenated methane containing a halogen other than fluorine.

17. The process of preparing fluorine derivatives of methane which comprises treating an antimony halide with hydrogen fluoride and a halogenated methane containing a halogen other than fluorine under sub-atmospheric pressure.

18. The process of preparing fluorine derivatives of methane which comprises treating an antimony halide with hydrogen fluoride and a halogenated methane containing a halogen other than fluorine under super-atmospheric pressure.

19. The process of preparing fluorine derivatives of methane which comprises reacting hydrogen fluoride and a halogenated methane containing a halogen whose atomic weight is greater than that of fluorine, in the presence of an antimony halide and a free halogen.

20. In a process of preparing halogen derivatives of methane containing fluorine, the step which comprises treating a pentavalent antimony halide containing a halogen other than fluorine with hydrogen fluoride and a halogenated methane containing at least three halogen atoms, of which at least one is a halogen atom other than fluorine.

21. The process of preparing poly-halogen derivatives of methane in which each molecule contains dissimilar halogens, one of which is fluorine, which comprises treating a poly-halogen derivative of methane containing a halogen other than fluorine with hydrogen fluoride and a pentavalent antimony halide containing fluorine and a halogen other than fluorine.

22. The process of continuously preparing fluorine derivatives of methane which comprises simultaneously treating a pentavalent antimony fluoro-chloride with a chloromethane containing more than one chlorine atom and hydrogen fluoride.

23. The process of producing fluoro-chloro-methanes which comprises passing hydrogen fluoride and a chloro-methane containing at least three chlorine atoms into an antimony halide catalyst containing tri- and pentavalent antimony chlorides.

24. The process of claim 23 in which the antimony halide catalyst is initially a mixture of antimony trichloride and antimony pentachloride.

25. The process of producing fluoro-chloro-methanes which comprises passing hydrogen fluoride and a chloro-methane containing at least three chlorine atoms into a mixture of tri- and pentavalent antimony chlorides containing combined chlorine and combined fluorine, and maintaining the reaction temperature within the range from about 45° C. to about 95° C.

26. A continuous process for producing fluoro-chloro-methanes which comprises simultaneously passing gaseous, substantially dry hydrogen fluoride and carbon tetrachloride into a relatively large amount of antimony pentachloride maintained at a temperature of about 60° C., continuously removing the evolved gases and vapors from the reaction zone and scrubbing them through the carbon tetrachloride which is to be introduced into the reaction zone, and separating fluoro-chloro-methanes from the residual gases and vapors.

27. A continuous process for producing difluoro-dichloro-methane which comprises simultaneously passing gaseous, substantially dry hydrogen fluoride and carbon tetrachloride in proportions corresponding to about 20 parts of hydrogen fluoride and about 77 parts of carbon tetrachloride per hour into about 600 parts of antimony pentachloride maintained at a temperature of about 60° C., continuously removing the evolved gases and vapors from the reaction zone and scrubbing them through the carbon tetrachloride which is to be introduced into the reaction zone, and separating difluoro-dichloro-methane from the residual gases and vapors.

HERBERT W. DAUDT.
MORTIMER A. YOUKER.